(12) United States Patent
Chien et al.

(10) Patent No.: US 12,145,071 B2
(45) Date of Patent: Nov. 19, 2024

(54) METHOD AND SYSTEM FOR ESTABLISHING CLONED GAME ACCOUNTS

(71) Applicant: Gamania Digital Entertainment Co., Ltd., Taipei (TW)

(72) Inventors: Chih-hao Chien, Taipei (TW); Cheng-yu Wang, Taipei (TW); Wan-chen Wu, Taipei (TW)

(73) Assignee: GAMANIA DIGITAL ENTERTAINMENT CO., LTD., Taipei (TW)

( * ) Notice: Subject to any disclaimer, the term of this patent is extended or adjusted under 35 U.S.C. 154(b) by 190 days.

(21) Appl. No.: 17/773,657

(22) PCT Filed: Nov. 2, 2019

(86) PCT No.: PCT/CN2019/115187
§ 371 (c)(1),
(2) Date: May 2, 2022

(87) PCT Pub. No.: WO2021/082021
PCT Pub. Date: May 6, 2021

(65) Prior Publication Data
US 2022/0379225 A1    Dec. 1, 2022

(51) Int. Cl.
*A63F 13/00* (2014.01)
*A63F 13/35* (2014.01)
*A63F 13/79* (2014.01)

(52) U.S. Cl.
CPC .............. *A63F 13/79* (2014.09); *A63F 13/35* (2014.09)

(58) Field of Classification Search
CPC .............................. A63F 13/79; A63F 13/792
See application file for complete search history.

(56) References Cited

U.S. PATENT DOCUMENTS

| | | | |
|---|---|---|---|
| 8,645,186 B2 | 2/2014 | Moukas et al. | |
| 8,805,971 B1 | 8/2014 | Roth et al. | |
| 2012/0190386 A1* | 7/2012 | Anderson | G01S 19/14 455/456.3 |

FOREIGN PATENT DOCUMENTS

| | | |
|---|---|---|
| CN | 103854218 A | 6/2014 |
| CN | 104408614 A | 3/2015 |
| CN | 108346091 A | 7/2018 |
| CN | 109636362 A | 4/2019 |

* cited by examiner

*Primary Examiner* — Milap Shah
*Assistant Examiner* — Eric M Thomas
(74) *Attorney, Agent, or Firm* — MUNCY, GEISSLER, OLDS & LOWE, PC (57) ABSTRACT

The present invention provides a method to establish cloned game accounts, when an auction information is posted on the game account trading platform, the game account trading platform will establish a testing game interface according to the game interface under the relevant game account, and generate a cloned game account based on the game objects, so that the buyer user primary account can enter this testing game interface to test the cloned game account.

4 Claims, 7 Drawing Sheets

METHOD AND SYSTEM FOR ESTABLISHING CLONED GAME ACCOUNTS

FIELD OF THE INVENTION

The present invention relates to a method and system for managing accounts, and more particularly to a method and system for establishing cloned game accounts.

BACKGROUND OF INVENTION

In recent years, entertainment activities are one of the ways for pressure release and physical and mental relaxation for modern people. Among the entertainment activities, game applications that allow interaction between users, audio and visual enjoyment as well as social exchange are most favored by the users. Meanwhile, thanks to functional improvement and popularization of smart devices, apart from computer games, mobile games are rapidly growing. Along with the promotion of international e-sports competitions by countries from all over the world, the game industry and game applications have become part of daily life.

Generally, users can have multiple accounts to play multiple games. Users can select specific games to play according to their preferences and available time. The game results, such as game objects need investment and operation by the users. After a period of time, users may have multiple dispersed game accounts having various asset values.

Currently, users can sell their own game accounts to other users. However, there are no public official platforms for game account trading. Game account sellers need to manage the whole selling procedure, and must pay attention to the updated information of the buyers at all times. For the game account sellers, the whole selling procedure is quite complicated. Moreover, there are no mechanisms for the buyer to verify the accounts to be sold by the seller. In other words, the buyer cannot use the seller's account for a test play. The whole game account transaction procedure is quite opaque and risky for both the buyer and the seller.

SUMMARY OF THE INVENTION

In view of this, the present invention provides a method and a system for establishing a cloned game account, which can establish a cloned game account based on the seller's account, for the buyer to have a test play.

The present invention provides a method to establish cloned game accounts, having the following steps: firstly, a) a server provides a game account trading platform. The game account trading platform is connected to multiple game interfaces. When any of the primary accounts register on the game account trading platform, the primary account will be bound to multiple game accounts of the same user in those interfaces.

Then, b) a seller user primary account selects any of the game accounts, edits the multiple game objects and an auction price, produces an auction information, and posts it on the game account trading platform.

c) When an auction information is posted on the game account trading platform, the game account trading platform will establish a testing game interface according to the game interface under the relevant game account, and generate a cloned game account based on the game objects, so that the buyer user primary account can enter this testing game interface to test the cloned game account.

d) If a transaction is completed for this auction information and the game account is transferred and bound to the buyer user primary account, the game account trading platform will delete the cloned game account.

Furthermore, the present invention provides a system for establishing cloned game accounts, which comprises a server, a seller client and a buyer client.

The server is provided with the game account trading platform connected to multiple game interfaces. When any of the primary accounts register on the game account trading platform, the primary account will be bound to multiple game accounts of the same user on those game interfaces.

The seller user client has a seller user primary account. The seller client selects any of the game accounts, edits the multiple game objects and an auction price, produces an auction information, and posts the auction information on the game account trading platform. In particular, when an auction information is posted on the game account trading platform, the game account trading platform will establish a testing game interface according to the game interface under the relevant game account, and generate a cloned game account based on the game objects.

The buyer client has a buyer user primary account. The buyer client enters the testing game interface to test the cloned game account, or selects the auction information to buy the game account. In particular, if the transaction is completed for this auction information, and the game account is transferred and bound to the buyer user primary account, the game account trading platform will delete the cloned game account.

DETAILED DESCRIPTION OF THE INVENTION

Embodiment 1, Establish Cloned Game Accounts

Figure 1:
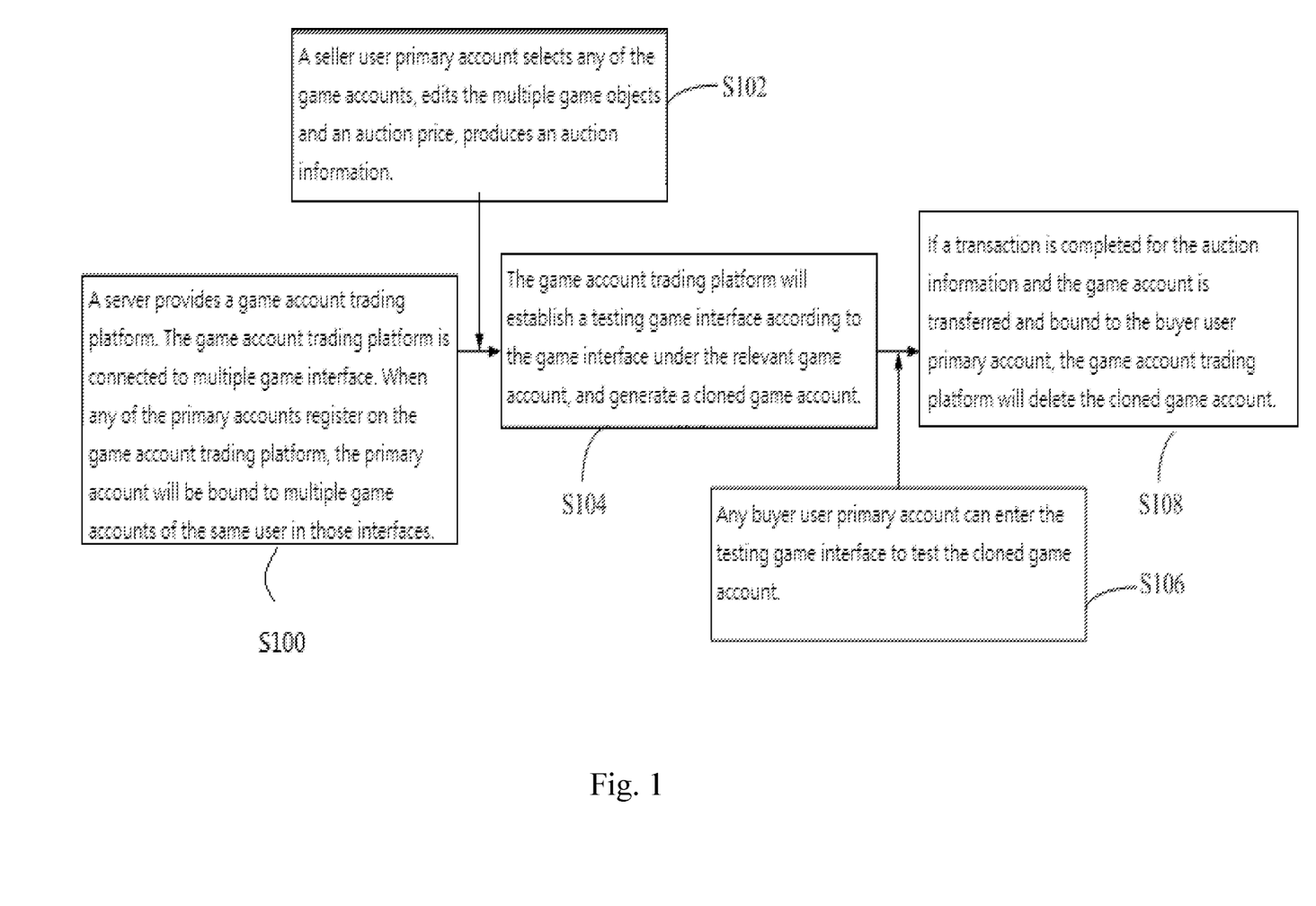
FIG. 1 illustrating an embodiment of the method to establish cloned game accounts according to the present invention.

FIG. 1 illustrates the processes of the method to establish cloned game accounts according to the present invention, including: firstly, a) a server provides a game account trading platform. The game account trading platform is connected to multiple game interfaces. When any of the primary accounts register on the game account trading platform, the primary account will be bound to multiple game accounts of the same user in those interfaces S100.

Then, b) a seller user primary account selects any of the game accounts, edits the multiple game objects and an auction price, produces an auction information S102, and posts the auction information on the game account trading platform.

Embodiment 2, the Seller Produces an Auction Information

FIG. 2*a* to FIG. 2*f* illustrates how the seller produces an auction information according to the present invention.

Figure 2A:
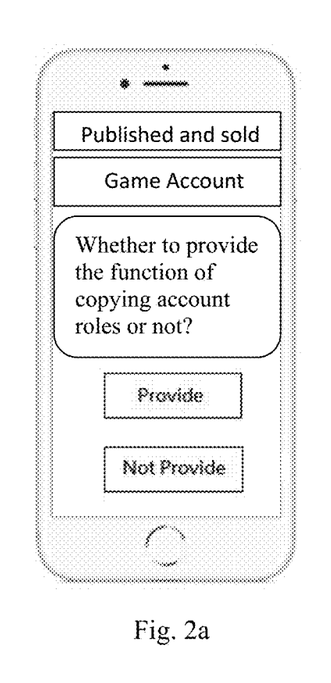
FIG. 2*a* to FIG. 2*f* illustrates how the seller produces an auction information according to the present invention.
Figure 2B:
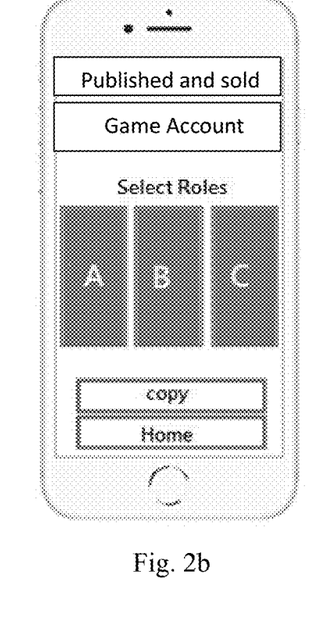
Figure 2C:
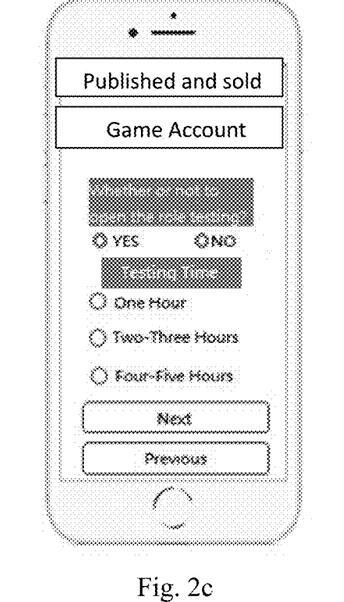
Figure 2D:
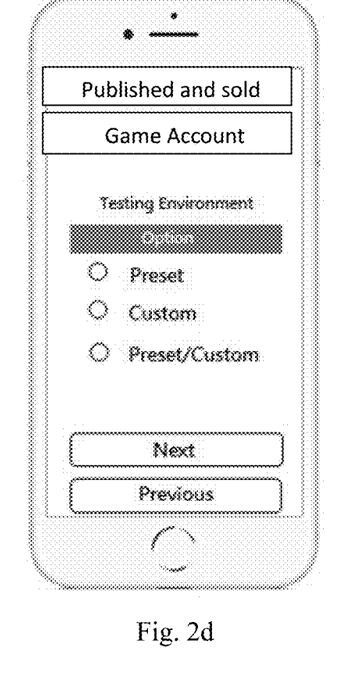
Figure 2E:
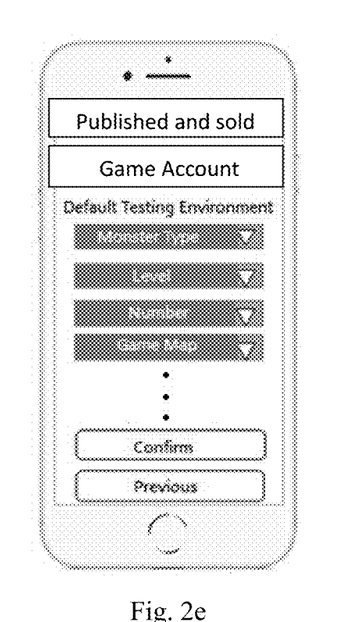
Figure 2F:
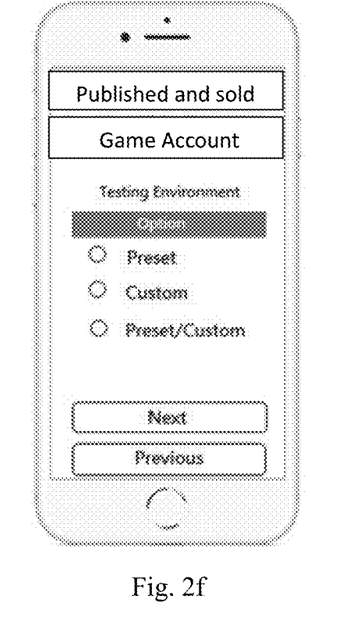

Referring to FIG. 2a, the seller user can enter the posting and selling interface provided by the game account trading platform to open the auction. Then, as shown in FIG. 2b, the role to be sold in the game account is selected and duplicated. Referring to FIG. 2c and FIG. 2d, further, the seller user can decide whether or not to open the role testing and to select appropriate testing conditions. In particular, as shown in FIG. 2e, such testing conditions include monster type, level, number or game map. Moreover, as shown in FIG. 2f, the seller can also choose to let the buyer set the required testing conditions.

In some embodiments, those game objects are selected from roles, props, services or the non-modifiable information data that the game account belongs to, Step b) also includes that, b1) the game account trading platform further locks the game account, and prohibit alteration to the non-modifiable information data of the account to be transacted.

c) When an auction information is posted on the game account trading platform, the game account trading platform will establish a testing game interface according to the game interface under the relevant game account, and generate a cloned game account S104 based on the game objects, so that any buyer user primary account can enter the testing game interface to test the cloned game account.

In some embodiments, the testing game interface has multiple situation objects, selected from the rival roles, competing roles, tasks or environment information data that the game interface belongs to. Moreover, any buyer user primary account can enter the testing game interface to test the cloned game account S106. Preferably, if multiple buyer user primary accounts apply for the cloned game account at the same time, the game account trading platform will based on the application times of those buyer user primary accounts, set different time periods for the accounts to test and experience the cloned game account.

Embodiment 3, the Buyer Tests the Cloned Game Account

Figure 3A:
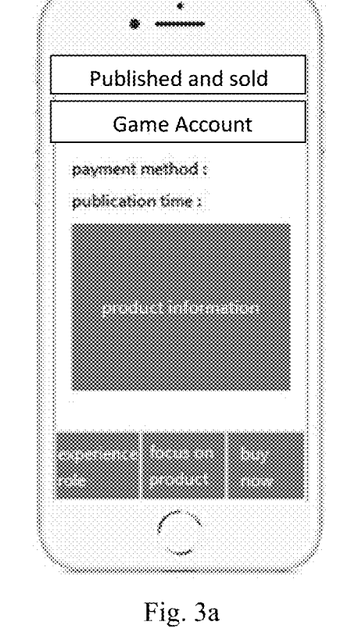
FIG. 3*a* to FIG. 3*d* illustrates how the buyer tests the cloned game account according to the present invention.
Figure 3B:
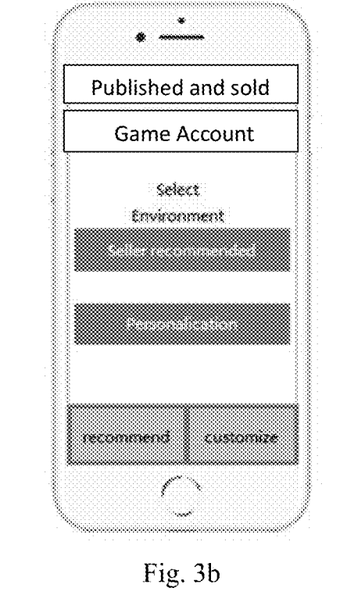
Figure 3C:
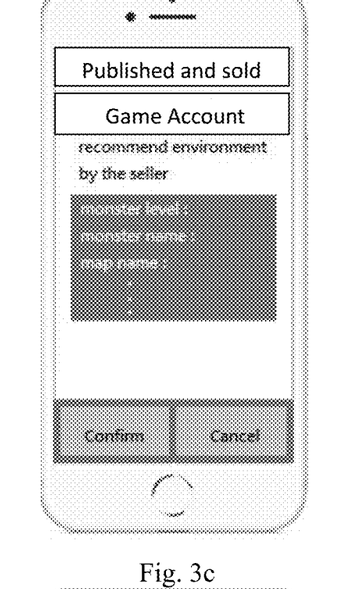
Figure 3D:
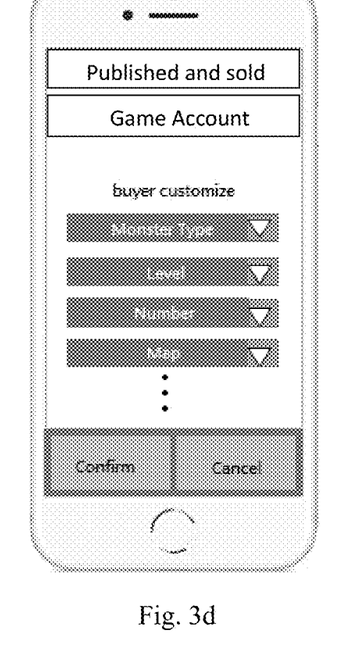

FIG. 3a to FIG. 3d illustrates how the buyer tests the cloned game account according to the present invention. Referring to FIG. 3a, the buyer user can log into the game account trading platform, select the auction information of interest to have a test. As shown in FIG. 3b, the game account trading platform will provide a recommended experiencing environment. As shown in FIG. 3c, the testing and experiencing conditions established by the seller are displayed. In addition, the buyer can also set the required testing and experiencing conditions. As shown in FIG. 3d, those testing and experiencing conditions include monster type, level, number or game map.

Later, determine if a transaction is completed for the auction information and the game account is transferred and bound to the buyer user primary account, d) Step S108, if a transaction is completed for the auction information and the game account is transferred and bound to the buyer user primary account, the game account trading platform will delete the cloned game account.

In some embodiments, those game objects are selected from level, progress, ranking, or modifiable information data that the game account belongs to. Step d) also includes that, d1) if a transaction is not completed for the auction information, a cycle time is set to update the modifiable information data of the auction information; it is to be noted that, d2) if a transaction is completed for the auction information, but the game account has not been transferred and bound to the buyer user primary account, the buyer user primary account can examine the game objects through the testing game interface.

Embodiment 4, a System for Establishing Cloned Game Accounts 400

Figure 4:
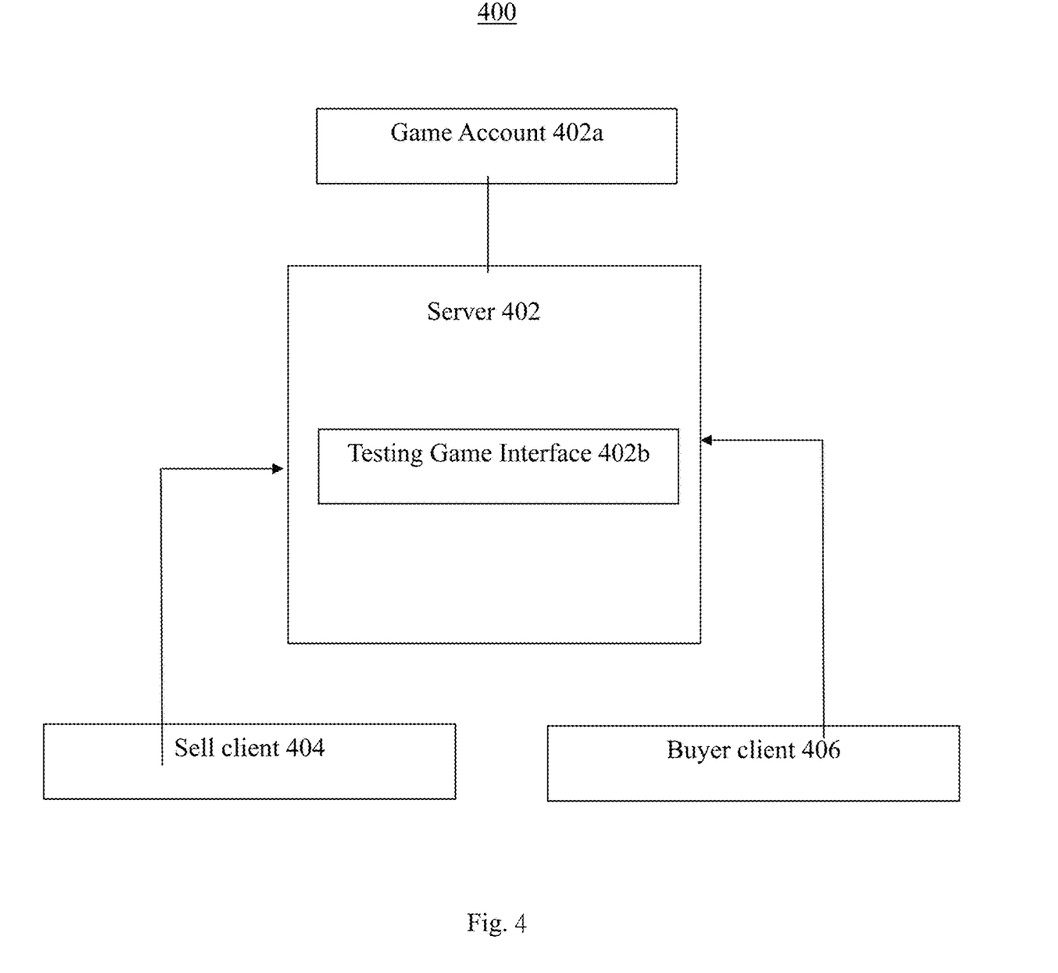
FIG. 4 illustrates the interconnection in the system for establish cloned game accounts.

FIG. 4 illustrates an embodiment of a system for establishing cloned game accounts 400. The system includes a server 402, a seller client 404 and a buyer client 406.

The server 402 can execute and be installed with a game account trading platform connecting multiple game interfaces. When any of the primary accounts register on the game account trading platform, the main account will be bounded to multiple game accounts of the same user of those game interfaces 402a.

The seller client 404 is connected to the server 402, having a seller user primary account to select any of the game accounts 402a, edit the multiple game objects under the game account 402a and an auction price, and produce an auction information. When the auction information is posted on the game account trading platform, the game account trading platform will establish a testing game interface 402b according to the game interface under the relevant game account, and produce a cloned game account based on the game objects.

The buyer client 406 is connected to the server 402, having a buyer user primary account to enter the testing game interface 402b to test the cloned game account, or to select the auction information to buy the game account; in particular, if a transaction is completed for the auction information and the game account is transferred and bound to the buyer user primary account, the game account trading platform will delete the cloned game account.

The executing steps of the method to establish cloned game accounts disclosed in the present invention can also be written into a software program to be stored in any recording media that can be recognized and interpreted by any microprocessing unit, or any object or device containing the above-mentioned recording media. With no limitation to the forms, the above-mentioned object can be a hard disk, floppy disk, compact disk, ZIP, MO, IC chip, RAM, or any object containing the above recording media that can be used by those skilled in the art.

Each feature disclosed in the descriptions of the present invention can be substituted by identical, equal or similar alternatives. Hence, unless specifically indicated, each feature disclosed is only an embodiment of one type of the alternatives or similar features.

The invention claimed is:

1. A method for establishing cloned game accounts, includes:
   a) a server provides a game account trading platform, the game account trading platform is connected to multiple game interfaces, when any of the primary accounts register on the game account trading platform, the primary account will be bound to multiple game accounts of the same user in those interfaces;
   b) a seller user primary account selects any of the game accounts on a display screen of a computer device, edits the multiple game objects and an auction price, produces an auction information, and posts it on the game account trading platform;
   c) when an auction information is posted on the game account trading platform, the game account trading platform will establish a testing game interface according to the game interface under the relevant game account, and a processor of the server generate a cloned game account based on the game objects, so that the buyer user primary account can enter this testing game interface to test the cloned game account;

d) if a transaction is completed for this auction information, and the game account is transferred and bound to the buyer user primary account, the game account trading platform will delete the cloned game account; and d1) if the transaction is not completed for the auction information, a cycle time is set to update a modifiable information data of the auction information, the modifiable information data includes level, progress, ranking, or modifiable information data;

the testing game interface has multiple situation objects, selected from rival roles, competing roles, tasks or environment information data that the game interface belongs to;

the required testing and experiencing conditions are set by the seller or/and the buyer;

if multiple buyer user primary accounts apply for the cloned game account at the same time, the game account trading platform sets different time periods for the accounts to test and experience the cloned game account.

2. The method for establishing cloned game accounts of claim 1, in particular, Step b) also includes that:

b1) the game account trading platform further locks the game account, and prohibit alteration to the non-modifiable information data of the account to be transacted.

3. The method for establishing cloned game accounts of claim 1, in particular, Step d) also includes that:

d2) if a transaction is completed for the auction information, but the game account has not been transferred and bound to the buyer user primary account, the buyer user primary account can examine the game objects through the testing game interface.

4. A system for establishing cloned game accounts, wherein:

a server is provided with a game account trading platform connected to multiple game interfaces, when any of primary accounts register on the game account trading platform, the primary account will be bound to multiple game accounts of the same user on the multiple game interfaces; a seller client has a seller user primary account, the seller client selects any of the game accounts, edits multiple game objects and an auction price, produces an auction information, and posts the auction information on the game account trading platform; and a buyer client has a buyer user primary account, the buyer client enters the testing game interface to test the cloned game account, or selects the auction information to buy the game account;

in particular, when an auction information is posted on the game account trading platform, the game account trading platform will establish a testing game interface according to the game interface under the relevant game account, and generate a cloned game account based on the game objects; in particular, if a transaction is completed for this auction information, and the game account is transferred and bound to the buyer user primary account, the game account trading platform will delete the cloned game account;

if the transaction is not completed for the auction information, a cycle time is set to update a modifiable information data of the auction information, the modifiable information data includes level, progress, ranking, or modifiable information data; the testing game interface has multiple situation objects, selected from the rival roles, competing roles, tasks or environment information data that the game interface belongs to; the required testing and experiencing conditions are set by the seller or/and the buyer; if multiple buyer user primary accounts apply for the cloned game account at the same time, the game account trading platform sets different time periods for the accounts to test and experience the cloned game account.

* * * * *